United States Patent
Dittmar

(10) Patent No.: US 10,487,945 B2
(45) Date of Patent: Nov. 26, 2019

(54) SEAL DEVICE

(71) Applicant: Steffen Dittmar, Tuebingen (DE)

(72) Inventor: Steffen Dittmar, Tuebingen (DE)

(*) Notice: Subject to any disclaimer, the term of this patent is extended or adjusted under 35 U.S.C. 154(b) by 128 days.

(21) Appl. No.: 15/663,760

(22) Filed: Jul. 30, 2017

(65) Prior Publication Data

US 2017/0335968 A1 Nov. 23, 2017

Related U.S. Application Data

(63) Continuation of application No. PCT/DE2016/100017, filed on Jan. 14, 2016.

(30) Foreign Application Priority Data

Feb. 5, 2015 (DE) .................. 10 2015 101 638

(51) Int. Cl.
- *F16J 15/32* (2016.01)
- *F16J 15/3228* (2016.01)
- *F16J 15/56* (2006.01)
- *F16J 15/06* (2006.01)
- *F16J 15/322* (2016.01)

(52) U.S. Cl.
CPC ......... *F16J 15/3228* (2013.01); *F16J 15/062* (2013.01); *F16J 15/322* (2013.01); *F16J 15/56* (2013.01)

(58) Field of Classification Search
CPC ................................ F16J 9/08; F16J 15/3228
USPC .................................. 277/504, 505, 422, 355
See application file for complete search history.

(56) References Cited

U.S. PATENT DOCUMENTS

| | | | | |
|---|---|---|---|---|
| 2,893,800 A | * | 7/1959 | Schmidt | F16J 9/20 277/453 |
| 3,268,234 A | * | 8/1966 | Knoebel | F16J 9/063 267/1.5 |
| 5,865,942 A | | 2/1999 | Sinclair | |
| 6,962,348 B2 | * | 11/2005 | Fink | F16J 15/004 277/608 |
| 7,197,936 B2 | * | 4/2007 | Baba | G01L 19/0645 73/715 |
| 2002/0017761 A1 | * | 2/2002 | Dubose | F16J 9/063 277/435 |

(Continued)

FOREIGN PATENT DOCUMENTS

| | | |
|---|---|---|
| DE | 19533005 | 3/1997 |
| EP | 0550941 | 7/1993 |
| EP | 1378681 A1 | 1/2004 |

*Primary Examiner* — Kristina R Fulton
*Assistant Examiner* — L. Susmitha Koneru
(74) *Attorney, Agent, or Firm* — Von Rohrscheidt Patents

(57) ABSTRACT

A seal device including a housing enveloping a piston rod, wherein the housing includes at least one ring groove at a cylindrical inside of the housing that is oriented towards the piston rod, wherein a seal ring configured as an annular disc is inserted into the at least one ring groove, wherein the at least one ring groove includes at least two protrusions at opposite side walls, wherein the at least two protrusions press against the seal ring inserted into the at least one ring groove, wherein the at least two protrusions are arranged opposite to each other in a portion of a groove opening oriented towards the piston rod in the at least one ring groove, and wherein the at least two protrusions are configured to dampen lateral movements of the seal ring.

14 Claims, 2 Drawing Sheets

(56) References Cited

U.S. PATENT DOCUMENTS

2002/0079649 A1\* 6/2002 Terpay .................. B64C 27/001
                                                        277/467
2004/0089836 A1\* 5/2004 Wu ...................... F16K 3/0227
                                                        251/326

\* cited by examiner

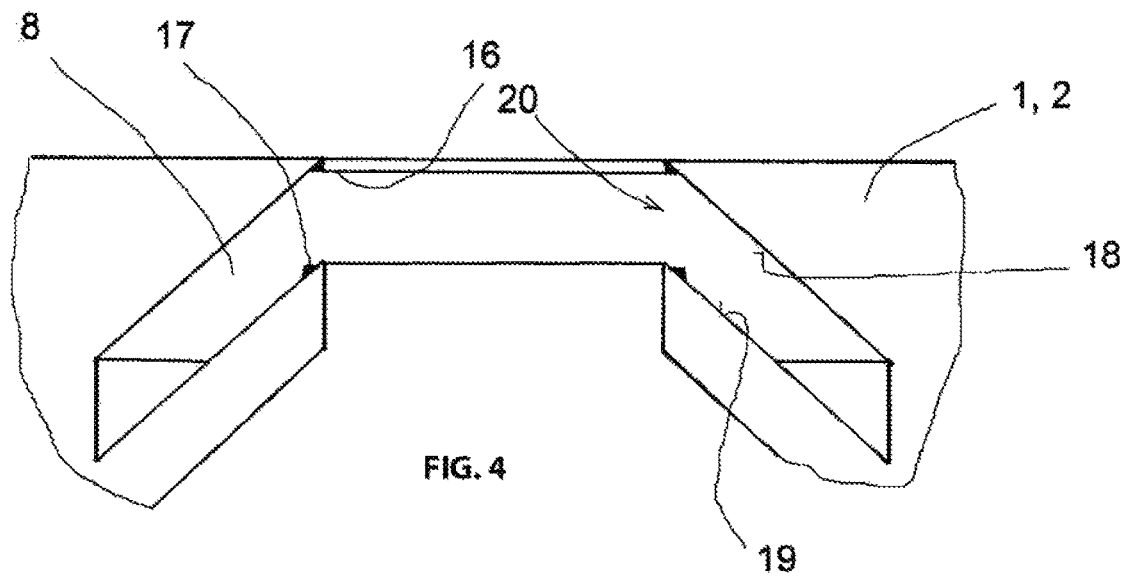
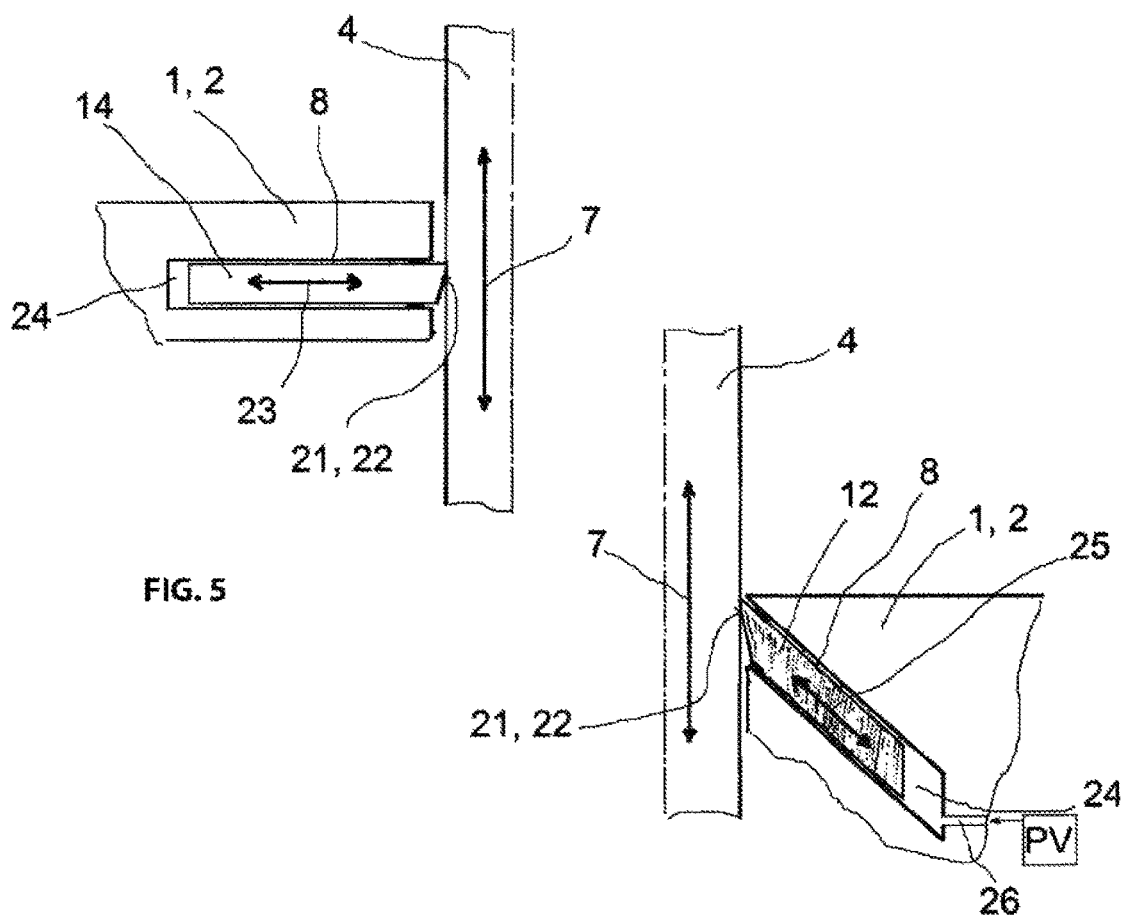

SEAL DEVICE

RELATED APPLICATIONS

This application is a continuation of International Application PCT/DE2016/100017 filed Jan. 14, 2016 and claims priority from German Patent Application DE 10 2015 101 638.9 filed on Feb. 5, 2015, both of which are incorporated in their entirety by this reference.

FIELD OF THE INVENTION

The invention relates to a seal device according to the preamble of claim 1.

BACKGROUND OF THE INVENTION

Seal devices are used in various applications like e.g. in telescopic forks for bicycles and at other axially adjustable piston rods. It is generally known to arrange front forks of bicycles with so called telescoping forks in a spring elastic and shock absorbing manner at a bicycle. A front wheel is then attached at both sides with its wheel axle at the telescoping fork. The telescoping fork can include spring elements and damper elements in order to receive jolts from the wheel in a spring elastic and dampened manner.

The operating cylinder of the telescoping fork in to which a piston rod penetrates are sealed relative to the piston rod by a seal device in a dust tight and water tight manner. A sealed device for telescoping forks of bicycles is known from DE 195 33 005 A1. Also EP 1 378 681 shows a damping device for a double tube damper with a seal device in which seal rings are inserted in the housing of the damping device in ring grooves which reach around the piston rod in a sealing manner.

In known seal devices there is often a problem in that fabrication tolerances in a portion of the seal devices and the housing which receives the seal rings in ring grooves or in other installation spaces has a disadvantageous effect upon the contaminant stripping function and the sealing function of the seal device. Vibrations in the portion of the seal rings can also degrade these functions.

BRIEF SUMMARY OF THE INVENTION

Thus, it is object of the invention to provide a seal device which has minimum friction and good sealing properties.

The object is achieved by a seal device including a housing enveloping a piston rod, wherein the housing includes at least one ring groove at a cylindrical inside of the housing that is oriented towards the piston rod, wherein a seal ring configured as an annular disc is inserted into the at least one ring groove, wherein the at least one ring groove includes at least two protrusions at opposite side walls, wherein the at least two protrusions press against the seal ring inserted into the at least one ring groove, wherein the at least two protrusions are arranged opposite to each other in a portion of a groove opening oriented towards the piston rod in the at least one ring groove, and wherein the at least two protrusions are configured to dampen lateral movements of the seal ring.

The seal device according to the invention includes a housing in which the employed seal rings are inserted in ring grooves in a vibration absorbing manner which is facilitated by using at least one protrusion at one of the opposite side walls of the ring grooves. The protrusion presses with a small force against the inserted seal ring which is then dampened with respect to its lateral movements. Advantageously opposite protrusions are respectively arranged at opposite side walls of the ring grooves.

The protrusions are arranged in a portion of a groove opening of the ring grooves oriented towards the piston rod. Thus, an opening portion of the ring grooves in which the seal rings are inserted is protected in an optimum manner relative to environmental impacts like dust and water when the protrusions are configured as an annular edge. Furthermore the protrusions seal the opening portion. Even when the protrusions are only arranged punctiform, this already provides a small damping function for the seal rings and thus also for radial deflections of a respective piston rod.

The size of the protrusions can be a function of the respective application of the seal device. Good results with respect to the seal function and the damping properties were made with protrusions which limit an annular space of the ring groove by 5% to 20% in the portion of the protrusions. Depending on the application also larger protrusions can be provided. The seal device can have one or plural ring grooves which have side walls that are inclined relative to an axial direction of the piston rod like the seal ring inserted into the piston rod. The inclination angle is advantageously an obtuse angle with respect to the piston rod which is between 0° and 90°, advantageously significantly above 45° up to 90° at the most relative to the axial direction of the piston rod. Through the inclination angle of ring groove and seal ring additional damping properties are achieved in the portion of the respective seal ring which has a positive effect upon the entire elastic and damping properties of the seal device and on the contaminant stripping properties of the seal device.

The seal rings are advantageously inserted into the respective ring grooves so that a free space is provided between the respective seal ring and the respective groove base wherein the free space facilitates that the seal ring can recede within certain limits within the free space into the ring groove upon a radial deflection of the piston rod. Thus, also radial deflections of the piston rod always yield an even contact of the seal lips at the piston rod which provides optimum sealing even upon a radial deflection of the piston rod. The seal edge of the seal ring forming the seal lip extends at least in an unloaded condition of the seal ring at an acute angle relative to an upper portion of the piston rod. This means that the seal edge is oriented at an acute angle to an upper opening of the housing of the seal device, wherein the piston rod protrudes into the respective telescopic tube through the upper opening of the housing. This orientation of the seal edge facilitates an improved sealing function compared to a seal edge that extends parallel to an axis of the piston rod.

Advantageously two or more ring grooves with inserted seal rings are arranged axially offset at the seal housing, wherein the ring grooves and the seal rings can be arranged at different orientations relative to the piston rod. Thus, for example an inclined arrangement of the ring grooves and of the seal rings can be provided at an obtuse angle, for example in an upper opening portion of the housing of the seal device, whereas the ring grooves are arranged downward at an obtuse angle in the lower portion of the housing. Between the inclined ring grooves seal rings can be provided that extend radially with reference to the piston rod. An arrangement of this type of differently oriented ring grooves can be very advantageous for particular applications in order to obtain a particularly strong sealing function with simultaneous vibration damping function.

The seal device can be attached in an upper portion of the telescopic tube by a press fit or can be attached at the telescopic tube by a threaded connection in order to seal the telescopic tube relative to the piston rod.

Furthermore there is an advantageous option to load at least a ring groove through a pressure channel with a variable pressure in order to control the contact pressure of the seal ring inserted into the ring groove at the piston rod.

BRIEF DESCRIPTION OF THE DRAWINGS

The invention is subsequently described in more detail with reference to embodiments illustrated in the drawing figure, wherein:

FIG. 4 illustrates an enlarged detail view of FIG. 3 in a portion of a ring groove with protrusions provided in the opening portion; and FIGS. 5 and 6 illustrate additional detail views of a seal device with horizontal or inclined ring grooves.

DETAILED DESCRIPTION OF THE INVENTION

Figure 1:
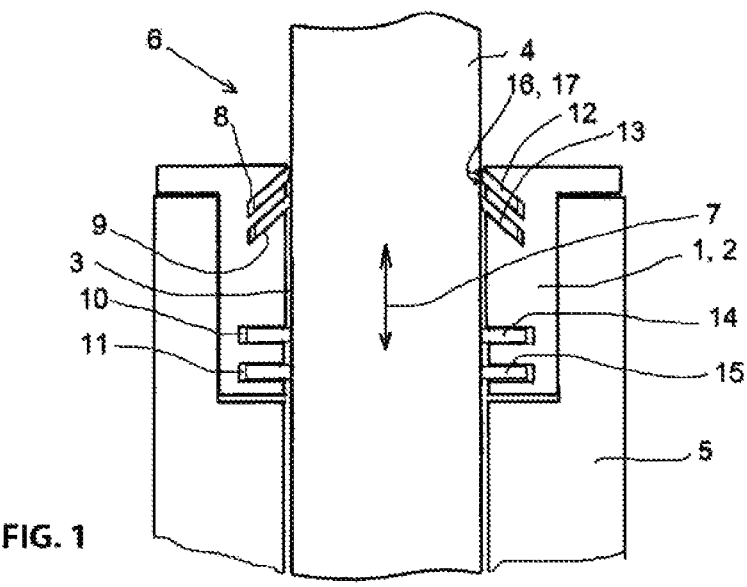
FIG. 1 illustrates a partial view of a telescopic force with a seal device.

FIG. 1 illustrates a telescopic fork for a bicycle in a portion of a seal device 1. The housing 2 of the seal device 1 is a rotation symmetrical component made from metal or plastic which includes a central cylindrical seal cavity 3 which can also be designated as a support cavity or seal cavity. A piston rod 4 is inserted into the pass through cavity 3 wherein the piston rod penetrates into a tube 5 of the telescopic fork 6. During the damping and spring function the piston rod 4 performs a stroke movement corresponding to the arrow direction 7 with respect to the tube 5 of the telescopic fork 6.

In the illustrated embodiment, the seal device 1 includes a total of four ring grooves 8-11 in which seal rings 12-15 are inserted. Thus, the upper ring grooves 8, 9 and the inserted seal rings 12, 13 are inclined relative to the axial direction of the piston rod 4, thus at an obtuse inclination angle. On the other hand side the ring grooves 10, 11 that are arranged in a lower portion of the seal device 1 are arranged with their seal rings 12, 15 horizontally or perpendicular to the axial direction of the piston rod 4. The piston rod 4 and the tube 5 are part of a known hydraulic or pneumatic spring and damper device that is used in telescopic forks of bicycles. The pneumatic or hydraulic damper devices are not an object of the instant invention but the seal device 1 in the upper portion of the tube 5 into which the piston rod 4 protrudes is. The seal rings 12-15 have slightly less thickness than the opening width of the associated ring grooves 8-11. However, protrusions are provided in the ring grooves 8-11 at opposite insides wherein the protrusions are sized so that they press against side surfaces of the seal rings 12-15. Thus, the seal rings 12-15 are centrally supported in the ring grooves 8-11 with a small lateral pressing force, wherein a lateral movement of the seal rings within the ring grooves is still possible for a radial displacement of the piston rod 4 relative to the seal device 1.

The seal rings 12-15 have a slightly smaller inner diameter in unloaded condition than the diameter of the piston rod 4.

The arrangement of the protrusions in the ring grooves and their function is described in more detail with reference to the subsequent FIGS. 2-6.

Figure 2:
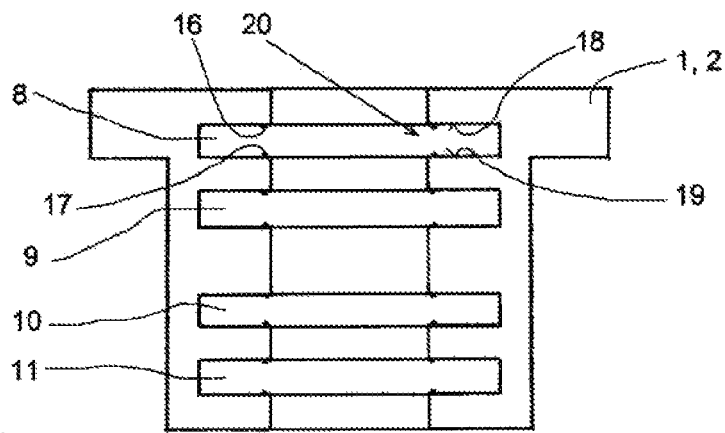
FIG. 2 illustrates a housing of a seal device with horizontal ring grooves in a sectional view.

FIG. 2 illustrates a sectional view of a housing 2 of a seal device 1 that is blown up relative to FIG. 1, wherein ring grooves of the housing are oriented perpendicular to the axial direction of the housing 2. In the ring grooves 8-11 protrusions 16, 17 are provided which are arranged at opposite insides 18, 19 of the ring grooves 8-11 in a portion of the groove opening 20 that is oriented towards the piston rod.

In the portion of the groove opening 20 of the ring grooves 8-11 wherein the groove opening is oriented towards the piston rod the protrusions 16, 17 can also be arranged at the seal rings 12-15 which also achieves an improved sealing function with a simultaneous vibration damping function.

Figure 3:
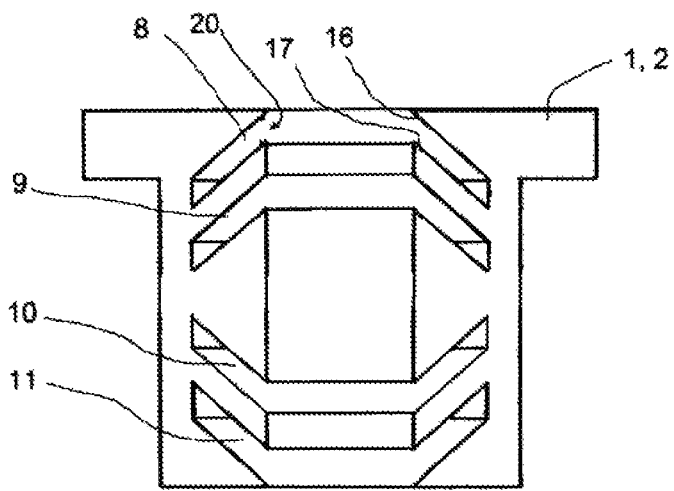
FIG. 3 illustrates another housing of a seal device with inclined ring grooves in a sectional view.

FIG. 3 illustrates and embodiment of a housing 2 of a seal device 1 with inclined ring grooves 8-11 which also include the protrusions 16, 17 in the portion of the groove opening 20.

An enlarged illustration of an inclined ring groove 8 is illustrated in FIG. 4. In the portion of the groove opening 20 there are protrusions 16, 17 with triangular cross sections, whose tips are oriented towards a non-illustrated seal ring and wherein the tips contact the seal ring with a low pressure in order to support the seal ring with a particular frictional force in its position in the ring groove 8.

FIG. 5 illustrates a detail view in a portion of a horizontal ring groove 8 according to FIG. 2 in which an accordingly oriented seal ring 14 is inserted. The seal ring 8 contacts the piston rod 4 with a seal edge which forms an angled seal lip 22. For a radial deflection of the piston rod 4 the seal ring 14 can be moved according to the arrow direction 23 within the ring groove 8 so that a seal edge 21 of the seal ring always envelops the piston rod 4 in an optimum manner. In order to provide the movability according to the arrow direction 23 for the seal ring 14 a clear space 24 is provided at the groove base of the ring groove 8.

The representation of FIG. 6 illustrates an embodiment with an inclined ring grove 8 as evident from FIG. 1 and FIG. 3. An accordingly configured seal ring 12 is inserted in the ring groove 8 also here like in FIG. 5 and movable in an arrow direction 25. Therefore a clear space 24 is also provided in the portion of the groove base.

The seal edge 21 forming a seal lip 22 contacts the circumferential surface of the piston rod 4 at an acute angle and thus seals the piston rod 4 relative to an inner space of the tube 5 of FIG. 1 against externally penetrating contamination or humidity.

The protrusions 16, 17 engaging the seal rings also have a sealing function for the respective ring grooves 8-11 in addition to a support and damping function with respect to the seal rings contacting the protrusions. This sealing function is achieved in an optimum manner by protrusions that are arranged in an annular manner at insides of the ring grooves. When merely punctiform protrusions are provided at insides a sealing function in the portion of the groove openings may not be achieved or may not be achieved completely, but this configuration of punctiform or segment shaped protrusions can be useful for particular applications for example when a smaller dampening function shall be achieved for the lateral movability of the seal rings.

It is also indicated in FIG. 6 that the ring groove 8 can be loaded with a variable pressure PV through a pressure channel 26 in order to control the contact pressure of the seal ring 12 inserted in the ring groove 8 wherein the contact pressure is applied at the piston rod 4.

What is claimed is:

1. A seal device, comprising:
a housing enveloping a piston rod,
wherein the housing includes at least one ring groove at a cylindrical inside of the housing that is oriented towards the piston rod,
wherein a seal ring configured as an annular disc is inserted into the at least one ring groove,
wherein the at least one ring groove includes a closed base and two opposite sidewalls,
wherein the at least one ring groove includes at least two protrusions at the two opposite side walls,
wherein the at least two protrusions protrude from the two opposite side walls in opposite directions that are orthogonal to lateral movements of the seal ring in the at least one ring groove and press against an outside of the seal ring in the directions that are orthogonal to the lateral movements of the seal ring in the at least one ring groove,
wherein the at least two protrusions are not in contact with the closed base,
wherein the at least two protrusions are arranged opposite to each other in a portion of a groove opening oriented towards the piston rod in the at least one ring groove, and
wherein the at least two protrusions are configured to dampen the lateral movements of the seal ring in the at least one ring groove.

2. The seal device according to claim 1, wherein the at least two protrusions respectively form an annular edge.

3. The seal device according to claim 1, wherein a ring space of the at least one annular groove is restricted by less than 5% in a portion of the at least two protrusions.

4. The seal device according to claim 1, wherein the opposite side walls of the at least one ring groove and side walls of the seal ring inserted into the at least one ring groove are inclined relative to an axial direction of the piston rod.

5. The seal device according to claim 4, wherein the opposite side walls of the at least one ring groove and of the inserted seal ring are oriented at an obtuse angle relative to an axial direction of the piston rod.

6. The seal device according to claim 1, wherein a free space is provided between the seal ring and a groove base of the at least one ring groove that receives the seal ring.

7. The seal device according to claim 1, wherein a seal edge oriented towards the piston rod is arranged at an acute angle relative to an upper portion of the piston rod at least in an unloaded condition of the seal ring.

8. The seal device according to claim 1, wherein the at least one ring groove includes at least two ring grooves with inserted seal rings that are arranged axially offset in the housing of the seal device.

9. The seal device according to claim 8, wherein the at least two ring grooves are arranged at different orientations relative to the piston rod.

10. The seal device according to claim 1, wherein the at least one ring groove is loadable with a variable pressure through a pressure channel.

11. A seal device, comprising:
a housing enveloping a piston rod,
wherein the housing is attached in an upper portion of a tube into which the piston rod penetrates axially moveable,
wherein the housing includes at least one ring groove at a cylindrical inside of the housing that is oriented towards the piston rod,
wherein a seal ring configured as an annular disc is inserted into the at least one ring groove and seals the piston rod relative to an inner space of the tube,
wherein the at least one ring groove includes a closed base and two opposite sidewalls,
wherein the at least one ring groove includes at least two protrusions at the two opposite side walls,
wherein the at least two protrusions protrude from the two opposite side walls in opposite directions that are orthogonal to lateral movements of the seal ring in the at least one ring groove and press against an outside of the seal ring in the opposite directions that are orthogonal to the lateral movements of the seal ring in the at least one ring groove,
wherein the at least two protrusions are arranged opposite to each other in a portion of a groove opening oriented towards the piston rod in the at least one ring groove, and
wherein the at least two protrusions are configured to dampen the lateral movements of the seal ring in the at least one ring groove.

12. The seal device according to claim 11, wherein the housing is attached in the upper portion of the tube, wherein the tube is a telescopic fork tube of a bicycle.

13. A seal device, comprising:
a housing enveloping a piston rod,
wherein the housing includes at least one ring groove at a cylindrical inside of the housing that is oriented towards the piston rod,
wherein a seal ring configured as an annular disc is inserted into the at least one ring groove,
wherein the at least one ring groove includes a closed base and two opposite sidewalls,
wherein the at least one ring groove includes at least one protrusion at the two opposite side walls,
wherein the at least one protrusion protrudes from at least one of the two opposite side walls in a direction that is orthogonal to lateral movements of the seal ring in the at least one ring groove and presses against an outside of the seal ring in the direction that is orthogonal to the lateral movements of the seal ring in the at least one ring groove,
wherein the at least one protrusion is arranged in a portion of a groove opening oriented towards the piston rod in the at least one ring groove, and
wherein the at least one protrusion is configured to dampen the lateral movements of the seal ring in the at least one ring groove.

14. The seal device according to claim 1, wherein the two opposite side walls are flat.

* * * * *